UNITED STATES PATENT OFFICE.

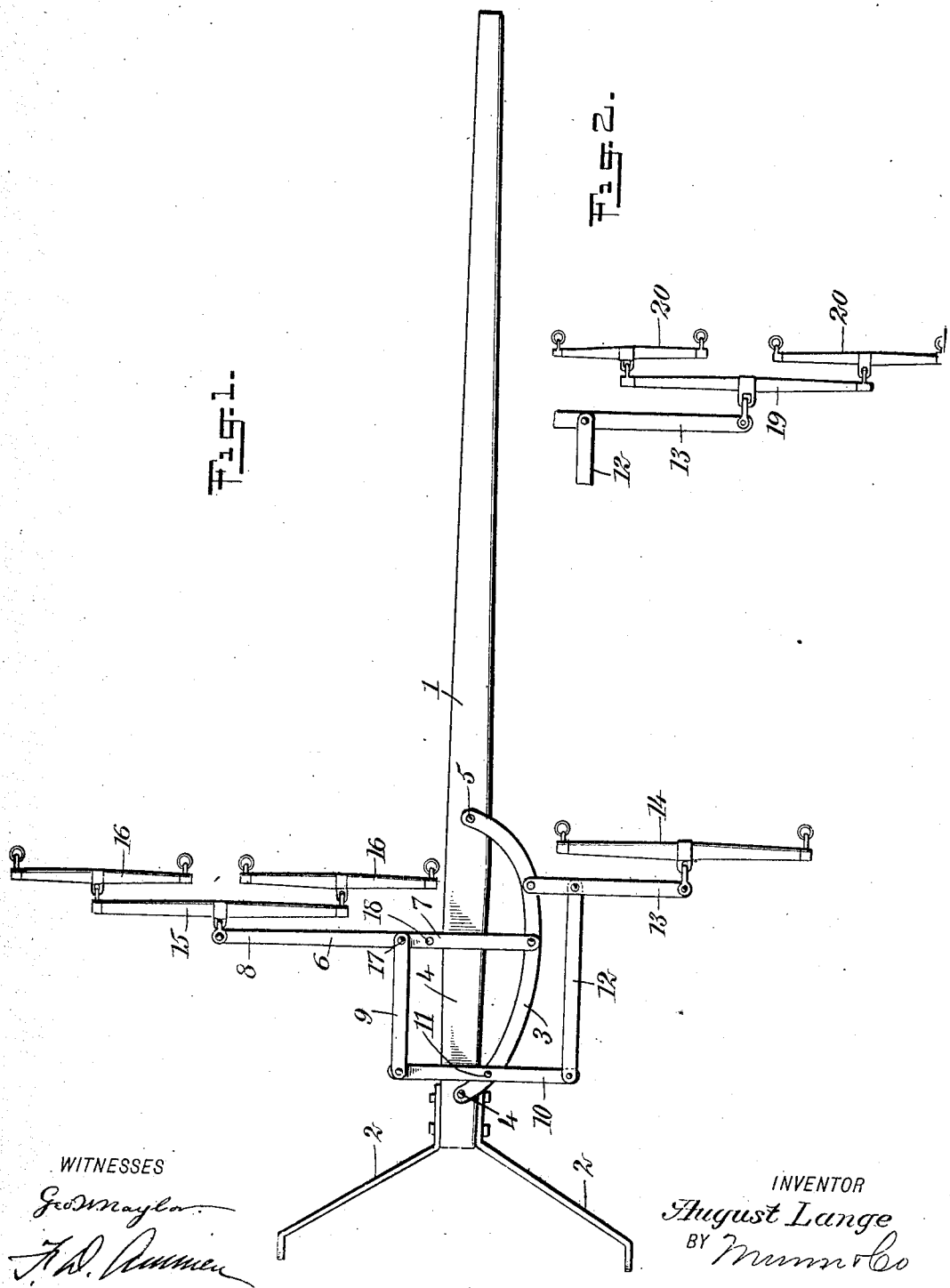

AUGUST LANGE, OF SCRIBNER, NEBRASKA.

DRAFT-EQUALIZER.

No. 872,240.  Specification of Letters Patent.  Patented Nov. 26, 1907.

Application filed May 31, 1906. Serial No. 319,502.

*To all whom it may concern:*

Be it known that I, AUGUST LANGE, a citizen of the United States, and a resident of Scribner, in the county of Dodge and State of Nebraska, have invented a new and Improved Draft-Equalizer, of which the following is a full, clear, and exact description.

This invention relates to draft equalizers such as used in connecting a plurality of draft animals to a vehicle or agricultural implement.

The object of the invention is to produce an equalizer mechanism which will enable two, three or four animals to be hitched, at the same time operating to divide the work substantially equally between them, while preventing side-draft upon the pole.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a plan showing the draft mechanism complete as used for three animals; and Fig. 2 is a plan showing a portion of the mechanism when it is used for four draft animals.

Referring more particularly to the parts, and especially to Fig. 1, 1 represents a pole which is connected by bracket arms 2 to a vehicle or plow. Near the rear extremity of this pole I provide a bracket 3 which consists of a curved bar, as shown, the extremities whereof are rigidly attached at 4 and 5 to the upper side of the pole. At a suitable point on the bracket there is pivotally attached a main equalizer bar 6 which extends transversely across the pole as shown, presenting a short arm 7 disposed near the bracket 3 and a long arm 8 disposed therebeyond. The arms of this lever are formed by means of a rearwardly extending link 9, the rear extremity whereof is attached to one arm of an auxiliary equalizer bar 10, which bar is pivotally attached at 11 to the bracket
3. The other arm of the bar 10 projects toward the right of the pole and is attached to a forwardly extending link 12. The forward extremity of this link is attached to a lever 13 which is pivotally attached to the bracket 3 as indicated. The outer extremity of this lever 13 which projects toward the right carries a swingle-tree 14. To the long arm 8 of the main equalizer bar 6 I attach a double-tree 15, the said double-tree carrying a pair of swingle-trees 16. The link 9 is attached to the main equalizer bar 6 at the point 17. Near this point an opening 18 is provided in the equalizer bar, which is disposed toward the right as shown. At the point 17 a removable bolt is provided, which may be removed so as to enable the link 9 to be attached at the opening 18. In this way the long arm 8 of the equalizer bar is lengthened so as to give the animals attached to the double-tree 15 a greater advantage.

With the arrangement shown in Fig. 1, the work is distributed evenly between the three animals, two of which are on one side of the pole hitched to the swingle-trees 16, while the other will be hitched to the swingle-tree 14. When the link 9 is attached at the opening 18, the work is evenly distributed on both sides of the pole, so that two or four horses may be used for drawing the vehicle or plow. When four horses are to be hitched to the pole, the swingle-tree 14 is replaced by a double-tree 19, as illustrated in Fig. 2, the said double-tree carrying swingle-trees 20. If it is desired to use two horses for drawing the implement or vehicle, the double-tree 15 will be replaced by a swingle-tree, the link 9 being attached at the opening 18.

With the construction described, I not only distribute the work equally between the animals, but prevent any side-draft upon the pole. Hence the vehicle continues to maintain a straight course. This is a matter of much importance in keeping a straight furrow.

Having thus described my invention, I claim as new and desire to secure by Letters Patent:

In an draft equalizer, the combination of a pole, a bracket having its ends secured to the pole and projecting laterally therefrom, a main equalizer bar having one end pivoted to the bracket intermediate of the ends of the bracket and extending across the pole, an auxiliary equalizer bar pivoted at about the center of its length to the rear end of the bracket with its ends projecting on opposite sides of the pole, a link having one end pivoted to one end of the auxiliary equalizer bar and its other end adjustably pivoted to the main equalizer bar at one side of the center thereof, a lever pivoted at one end to the forward end of the bracket in front of the pivot of the main equalizer bar, a link pivoted to the other end of auxiliary equalizer bar and to the said lever at one side of its center of length, and draft appliances attached to the ends of the main equalizer and lever.

In testimony whereof I have signed my name to this specification in the presence of two subscribing witnesses.

AUGUST LANGE.

Witnesses:
SOLOMON SPANGLER,
C. W. MARQUARDT.